Patented Mar. 25, 1952

2,590,815

UNITED STATES PATENT OFFICE 2,590,815

ALKANOLAMINE SALTS OF 2,4,5-TRICHLOROPHENOXYACETIC ACID

Robert C. Dosser, Midland, and Leeds C. White, Jr., Bay City, Mich., assignors to The Dow Chemical Company, Midland, Mich., a corporation of Delaware No Drawing. Application March 9, 1950, Serial No. 148,747

3 Claims. (Cl. 260—501)

This invention is concerned with the alkanolamine salts of 2,4,5-trichlorophenoxyacetic acid having the following formula:

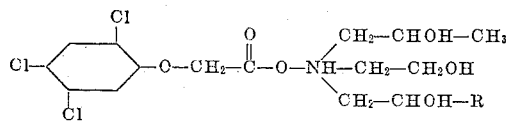

wherein R represents hydrogen or methyl. These new compounds are viscous oils, somewhat soluble in many organic solvents, and of very high water solubility. They are of value as active constituents of plant growth control compositions.

The new compounds may be prepared by reacting 2,4,5-trichlorophenoxyacetic acid with monoethanoldiisopropanolamine (N,N-bis(2-hydroxypropyl)-1-amino-2-ethanol) or diethanolmonoisopropanolamine (N,N-bis(2-hydroxyethyl)-1-amino-2-propanol). In carrying out the reaction, the reactants may be added portionwise one to the other with stirring. The amounts employed are such that the pH of the ultimate mixture is 7. Good results have been obtained when operating at temperatures of from 70° to 100° C., and when employing substantially equimolecular proportions of the reactants.

In a preferred method of operation, substantially equimolecular proportions of 2,4,5-trichlorophenoxyacetic acid and the alkanolamine are mixed together and the resulting dispersion heated for a period of time with stirring and at a temperature of from 70° to 100° C. An additional amount of 2,4,5-trichlorophenoxyacetic acid or alkanolamine, depending upon the pH of the mixture, is then added portionwise to the reaction zone until the pH of the ultimate mixture is 7. This reaction mixture constitutes the desired product in substantially pure form.

The monoethanol diisopropanolamine (boiling at 152° C. at 3 millimeters' pressure), as above employed, may be prepared by reacting one molecular proportion of monoethanolamine with 2 molecular proportions of propylene oxide. In a preferred method for carrying out the reaction, the propylene oxide is added slowly to the monoethanolamine in a vessel provided with a reflux condenser and an agitator. The process is generally carried out at room temperatures, the reaction beginning promptly when the reactants are mixed together at any temperature above 0° C. Temperatures of 20° C. to 80° C. are quite satisfactory. The process is preferably carried out simply by mixing the two reactants in the absence of water or other diluents. After the appropriate proportion of the propylene oxide has been added to the monoethanolamine, the mixture is retained at reaction temperature until evolution of heat stops. The monoethanol diisopropanolamine is then separated by fractional distillation at reduced pressure.

The diethanol monoisopropanolamine (boiling at 156° C. at 3 millimeters' pressure) may be prepared by reacting substantially equimolecular proportions of diethanolamine and propylene oxide. The conditions of reaction and methods of preparation and separation are essentially as described in the preceding paragraph. Detailed information concerning the methods of preparation and properties of the alkanolamines, as herein described, are disclosed in U. S. application Serial No. 4,466.

The following examples illustrate the invention but are not to be construed as limiting the same:

Example 1

127.7 grams (0.5 mole) of 2,4,5-trichlorophenoxyacetic acid was dispersed in 84.6 grams (0.47 mole) of monoethanol diisopropanolamine and the resulting mixture heated with stirring at a temperature of from 90° to 100° C. for ½ hour. An additional amount of monoethanol diisopropanolamine was then added portionwise to the reaction mixture with stirring until the pH of the resulting solution was 7. In the latter operation, 9.5 grams (0.05 mole) of monoethanol diisopropanolamine was employed. At the conclusion of the reaction the product was removed from the reactor and cooled to room temperature. This product, the monoethanol diisopropanolamine salt of 2,4,5-trichlorophenoxyacetic acid, had a refractive index $n/D$ of 1.5316 at 60° C., a density of 1.352 at 60°/4° C., a specific gravity of 1.330 at 60°/60° C., and a viscosity of 18,605 centipoises at 60° C.

Example 2

127.7 grams (0.5 mole) of 2,4,5-trichlorophenoxyacetic acid was dispersed in 79 grams (0.48 mole) of diethanol monoisopropanolamine and the resulting dispersion warmed with stirring at a temperature of from 90° to 100° C. for ½ hour. An additional amount of diethanol monoisopropanolamine was then added portionwise to the reaction mixture with stirring until the pH of the resulting solution was 7. In the latter operation 4.8 grams (0.029 mole) of diethanol monoisopropanolamine was employed. At the conclusion of the reaction the product was removed from the reactor and cooled to room temperature. This product, the diethanol monoisopropanolamine salt of 2,4,5-trichlorophenoxyacetic acid, had a refractive index $n/D$ of 1.5428 at 60° C., a density of 1.357 at 60°/4° C., a specific gravity of 1.380 at 60°/60° C., and a viscosity of 10,855 centipoises at 60° C.

In recent years 2,4,5-trichlorophenoxyacetic acid has been used as an active constituent of growth control compositions. In such use, the acid often is employed in the form of an alkanolamine salt. Such growth control compositions are generally made up as water solutions of the active ingredient. If the active ingredient tends to crystallize out or form a two-phase mixture with water under spraying conditions, plugging of spray equipment, irregularities of application, and other troubles are encountered.

The alkanolamine salts of 2,4,5-trichlorophenoxyacetic acid commonly employed in aqueous herbicide spray compositions are only moderately soluble in water and not adapted for the preparation of concentrated and stable aqueous herbicide sprays.

The alkanolamine salts of the present invention are readily soluble in water. This desirable solubility characteristic makes possible the preparation of aqueous spray compositions containing the valuable 2,4,5-trichlorophenoxyacetic acid alkanolamine salt type herbicide, which do not crystallize out on standing.

We claim:

1. An alkanolamine salt of 2,4,5-trichlorophenoxyacetic acid having the formula

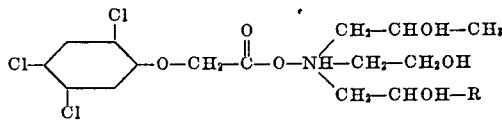

wherein R represents a member of the group consisting of hydrogen and methyl.

2. Monoethanoldiisopropanolamine salt of 2,4,5-trichlorophenoxyacetic acid.

3. Diethanolmonoisopropanolamine salt of 2,4,5-trichlorophenoxyacetic acid.

ROBERT C. DOSSER.
LEEDS C. WHITE, Jr.

REFERENCES CITED

The following references are of record in the file of this patent:

UNITED STATES PATENTS

| Number | Name | Date |
|---|---|---|
| 2,396,513 | Jones | Mar. 12, 1946 |